(12) United States Patent
Feit (10) Patent No.: US 7,918,593 B2
(45) Date of Patent: Apr. 5, 2011

(54) HEAD UNIT BACKGROUND ILLUMINATION

(75) Inventor: Steven Feit, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 12/061,207

(22) Filed: Apr. 2, 2008

(65) Prior Publication Data

US 2010/0328964 A9 Dec. 30, 2010

Related U.S. Application Data

(60) Provisional application No. 61/016,919, filed on Dec. 27, 2007.

(51) Int. Cl.
B60Q 3/04 (2006.01)
(52) U.S. Cl. .............. 362/489; 362/510; 362/296.09
(58) Field of Classification Search .......... 362/489, 362/491, 510, 85, 86, 87, 88, 29, 296.09, 362/311.01
See application file for complete search history.

(56) References Cited

U.S. PATENT DOCUMENTS

| | | | |
|---|---|---|---|
| 4,218,775 A | | 8/1980 | Cox et al. |
| 4,525,772 A | | 6/1985 | Peck |
| 5,198,936 A | * | 3/1993 | Stringfellow ............... 359/831 |
| 5,397,867 A | | 3/1995 | Demeo |
| 5,481,409 A | * | 1/1996 | Roberts ....................... 359/839 |
| 5,831,774 A | | 11/1998 | Toshima et al. |
| 5,964,514 A | | 10/1999 | Carter et al. |
| 6,045,243 A | * | 4/2000 | Muth et al. .................. 362/494 |
| 6,286,972 B1 | | 9/2001 | Shepherd et al. |
| 6,326,569 B1 | | 12/2001 | Ardrey et al. |
| 6,409,355 B1 | * | 6/2002 | Simon et al. ................ 362/23 |
| 6,761,460 B2 | * | 7/2004 | Yang ........................... 362/600 |
| 6,886,955 B2 | | 5/2005 | Miyasaka |
| 6,990,208 B1 | | 1/2006 | Lau et al. |
| 7,031,061 B2 | | 4/2006 | Ito |
| 7,033,061 B1 | | 4/2006 | Wu |
| 7,067,754 B2 | | 6/2006 | Weston et al. |
| 7,224,537 B2 | | 5/2007 | Choi |
| 7,338,177 B2 | * | 3/2008 | Lynam ....................... 359/839 |
| 2004/0017687 A1 | * | 1/2004 | Misaras ...................... 362/489 |
| 2004/0145885 A1 | | 7/2004 | Chen |
| 2006/0072300 A1 | | 4/2006 | Hayashi |
| 2006/0095166 A1 | | 5/2006 | Daly et al. |
| 2007/0201217 A1 | | 8/2007 | Imai |

* cited by examiner

Primary Examiner — Stephen F. Husar
Assistant Examiner — Peggy A. Neils
(74) Attorney, Agent, or Firm — Mark E. Duell, Esq.; Emerson Thomson Bennett (57) ABSTRACT

A front panel display assembly may have an integrated decorative film having first and second sides. The first side may have a half-mirroredrface that allows the passage of light in only a single direction and the second side may have a non-uniform diffusion pattern that extends across it. The non-uniform diffusion pattern may regulate and diffuse light irradiated onto the second side to pass through the integrated decorative film and to be regulated and emitted uniformly across the front panel display assembly.

18 Claims, 9 Drawing Sheets

HEAD UNIT BACKGROUND ILLUMINATION

CROSS-REFERENCE TO RELATED APPLICATIONS

This application claims the benefit of U.S. Provisional Application Ser. No. 61/016,919, titled HEAD UNIT BACKGROUND ILLUMINATION, filed Dec. 27, 2007, which is herein incorporated by reference.

I. BACKGROUND OF THE INVENTION

A. Field of Invention

This invention pertains to the art of methods and apparatuses regarding display apparatuses and more specifically to methods and apparatuses regarding the background illumination of vehicle display devices.

B. Description of the Related Art

It is known to provide electronic devices, such as head units for vehicle entertainment or audio systems, with a face plate assembly. The face plate assembly has a combination of user operable buttons that allow an operator to selectively control the electronic device. Commonly, user operable buttons are provided on a button carrier that comprises a single molded plastic piece. A front panel or bezel couples the button carrier to the electronic device. Often, the bezel is a single piece of molded plastic having a plurality of holes or apertures. Each of the bezel apertures correspond to a user operable button such that the user operable button protrudes or may be accessed through the bezel aperture. Commonly, the front panel or bezel comprises a color that may easily transmit light irradiated upon it by a light source positioned behind the bezel.

It is known to mold the user operable buttons, or areas adjacent to each of the user operable buttons, in a clear plastic or resin. An opaque or translucent paint is then applied to the user operable buttons such that when the user operable buttons are illuminated from behind by a light source, words, symbols, or other designs are displayed. Often, more than one button carrier is used, for example, a number of user operable buttons may be located on opposing sides of a display that may be provided to the electronic device for viewing visual media. The display may be viewed by an operator or vehicle occupant through a corresponding bezel aperture provided to the bezel. The display may be coupled or attached to a display carrier that is similar in composition and color to the button carrier. The bezel may also couple the display carrier to the electronic device utilizing a method similar to that used with the button carrier.

It is known to provide the face plate assembly with a printed circuit board (PCB). The PCB has a plurality of apertures through which a light source can be coupled to the PCB to provide backlighting for the button carrier, the display, and the bezel so that the electronic device may be viewed and operated during low light conditions. Commonly, the light source is a light emitting diode (LED) or other point light source. "Hot spots" or areas receiving an uneven distribution of the light emitted from the light source may occur from the use of a point light source such as a LED.

It is known to eliminate hot spots by placing a diffuser or variable light transmittance layer between the light source and the button carrier, display carrier, and the bezel. The diffuser comprises a layer of translucent material that has a pattern of opaque material upon it. The pattern of opaque material operates to diffuse the greatest amount of irradiated light in areas receiving the greatest concentration of irradiated light. Other methods include the use of lens assemblies positioned in front of the light source, reflective layers placed behind the light source, and combinations of the same.

Although known methods work well for their intended purpose, several disadvantages exist. Known methods for diffusing light emitted from a point light source require the inclusion of the separate diffusion layer, lens assemblies, reflective layers and any combination thereof within the front place assembly. Inclusion of known diffuser apparatuses comprising additional components decreases the amount of space within the front face plate assembly. Or, alternatively, the size of the front face plate assembly must be increased to provide the space required for the additional components.

II. SUMMARY OF THE INVENTION

According to one embodiment of the invention, a bezel comprises a plurality of bezel apertures extending through the bezel; and, an integrated decorative film. The integrated decorative film comprises a first side having a half-mirrored surface that allows emitted light to pass through the bezel in a single direction only; and, a second side having a non-uniform diffusion pattern that is dispersed across the second side as a function of distance from a light source positioned to irradiate light on the second side that allows a light irradiated onto the second side to pass through the decorative film and be regulated and emitted uniformly across the bezel.

According to one embodiment of the invention, a bezel comprises a plurality of bezel apertures extending through the bezel; and, an integrated decorative film. The integrated decorative film comprises a first side having a half-mirrored surface that allows emitted light to pass through the bezel in a single direction only; and, a second side having a non-uniform diffusion pattern that is dispersed across the second side as a function of distance from a light source positioned to irradiate light on the second side that allows a light irradiated onto the second side to pass through the decorative film and be regulated and emitted uniformly across the bezel. The integrated decorative film comprises a transparent resin; and, the non-uniform diffusion pattern comprises a relatively heavier print area and a relatively lighter print area, wherein the difference between the refractive index of the relatively heavier print area and the transparent resin is greater than the different between the refractive index between the relatively lighter print area and the transparent resin.

According to one embodiment of the invention, a bezel comprises a plurality of bezel apertures extending through the bezel; and, an integrated decorative film. The integrated decorative film comprises a first side having a half-mirrored surface that allows emitted light to pass through the bezel in a single direction only; and, a second side having a non-uniform diffusion pattern that is dispersed across the second side as a function of distance from a light source positioned to irradiate light on the second side that allows a light irradiated onto the second side to pass through the decorative film and be regulated and emitted uniformly across the bezel. The integrated decorative film is integrated with the bezel during an injection molding process.

According to one embodiment of the invention, a head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source.

According to one embodiment of the invention, a head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source. The integrated decorative film comprises a transparent resin; and, the non-uniform diffusion pattern comprises a relatively heavier print area and a relatively lighter print area wherein the difference between the refractive index of the relatively heavier print area and the transparent resin is greater than the different between the refractive index between the relatively lighter print area and the transparent resin.

According to one embodiment of the invention, a head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source. The integrated decorative film is integrated with the bezel during an injection molding process.

According to one embodiment of the invention, a vehicle entertainment system comprises a device component, an output component, and a control portion. The control portion comprises an electronic control unit and a head unit. The head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source.

According to one embodiment of the invention, a vehicle entertainment system comprises a device component, an output component, and a control portion. The control portion comprises an electronic control unit and a head unit. The head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source. The integrated decorative film comprises a transparent resin; and, the non-uniform diffusion pattern comprises a relatively heavier print area and a relatively lighter print area wherein the difference between the refractive index of the relatively heavier print area and the transparent resin is greater than the different between the refractive index between the relatively lighter print area and the transparent resin.

According to one embodiment of the invention, a vehicle entertainment system comprises a device component, an output component, and a control portion. The control portion comprises an electronic control unit and a head unit. The head unit comprises an electronic control portion and a front face panel assembly. The electronic control portion comprises a printed circuit board and a light source coupled to the printed circuit board. The front face panel assembly comprises a button carrier and a bezel. The button carrier portion comprises a plurality of manually actuated buttons operatively coupled to the printed circuit board. The bezel is coupled to the printed circuit board and comprises a plurality of bezel apertures extending through the bezel, wherein the plurality of manually actuated buttons extend through the plurality of bezel apertures; and, an integrated decorative film. The integrated decorative film comprises a first side having a half-mirrored surface that allows light emitted from the light source to pass through the bezel while substantially completely preventing light from passing in the opposite direction; and, a second side having a non-uniform diffusion pattern that is dispersed across the second side as a function of distance from the light source. The integrated decorative film is integrated with the bezel during an injection molding process.

One advantage of this invention is the illumination pattern is spread evenly across the front panel or bevel and "hotspots" are eliminated from areas surrounding the light source.

Another advantage is that the number of components required to be placed within the front face plate assembly can be reduced.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
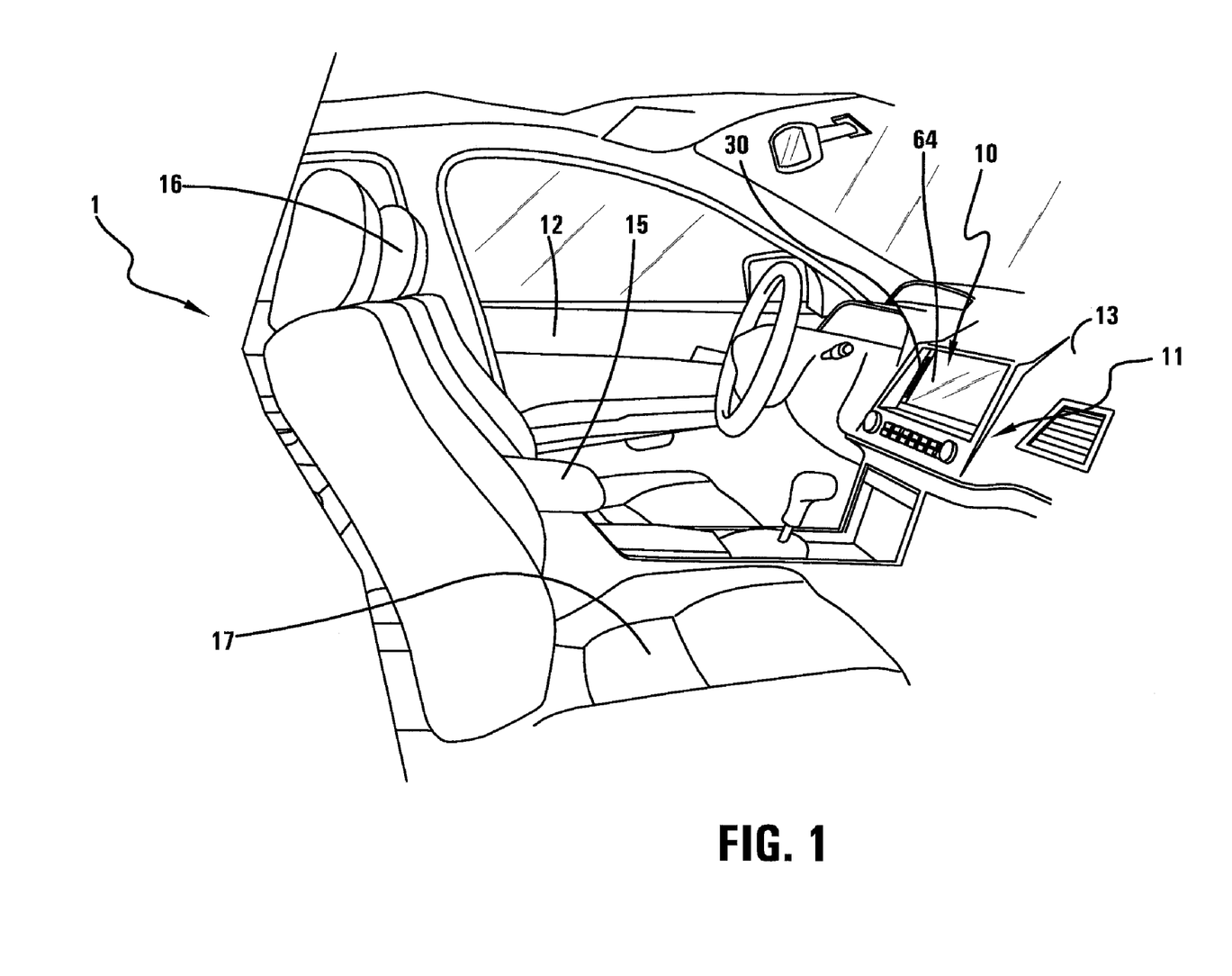
FIG. 1 shows a perspective view of a head unit comprising a front face plate assembly positioned within the interior portion of a vehicle according to one embodiment of the invention.

Referring now to the drawings wherein the showings are for purposes of illustrating embodiments of the invention only and not for purposes of limiting the same, FIG. 1 shows a head unit 10, positioned within the interior space 12 of a vehicle 1, comprising a front face plate assembly 30 according to one embodiment of the invention. Although the front face plate assembly 30 can be utilized with any type of electronic device having a front face plate or bezel, the embodiments are described below as being utilized with the head unit 10 comprising the front face plate assembly 30 of a vehicle entertainment system 11 for the sake of clarity.

Figure 2:
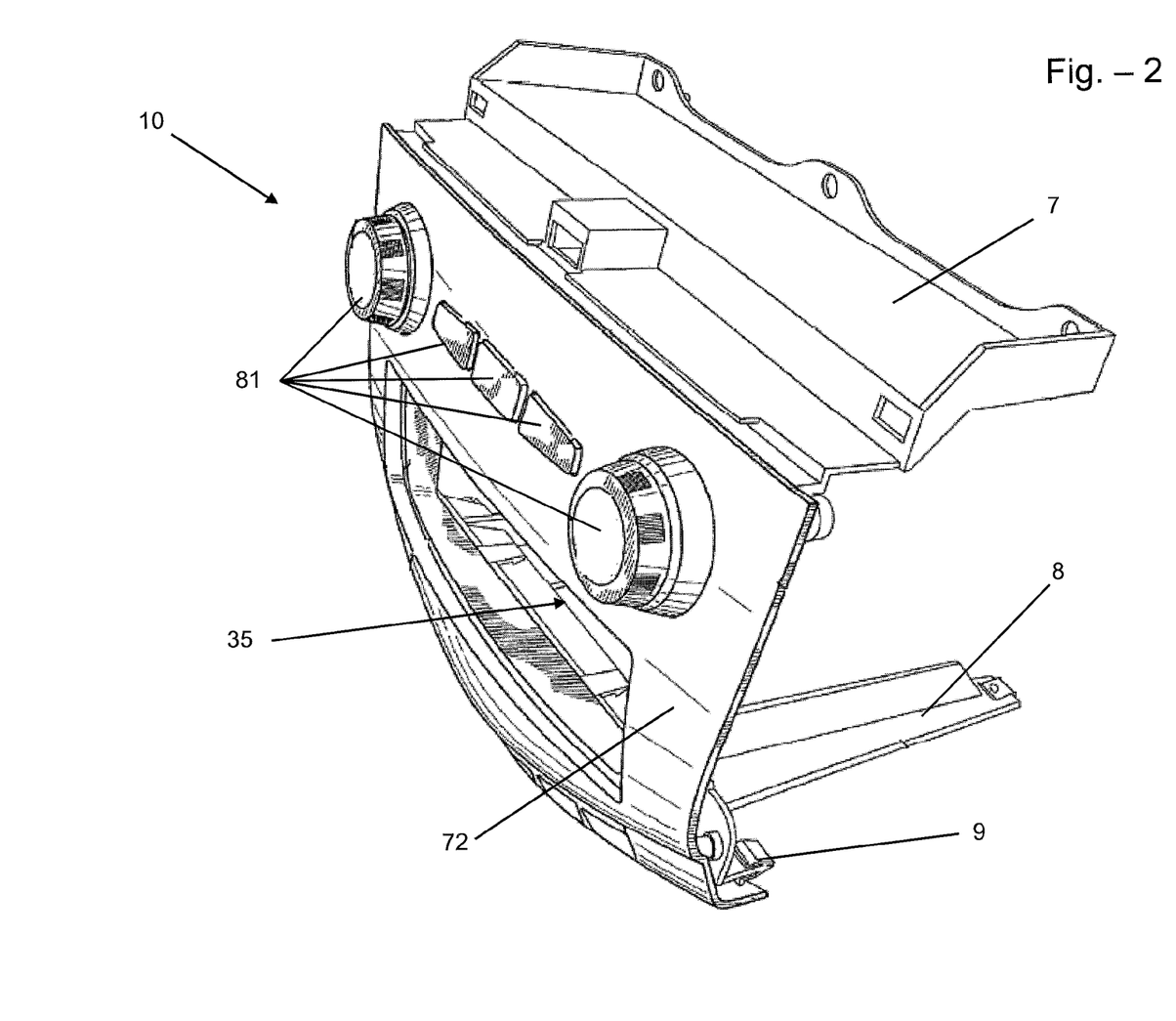
FIG. 2 shows a perspective view of a head unit according to one embodiment of the invention.

With reference now to FIGS. 1 and 2, the vehicle entertainment system 11 may be located within the interior space 12 of a vehicle 1. The vehicle 1 may comprise a passenger vehicle or any other type of vehicle chosen with sound judgment. In one embodiment, the head unit 10 of the vehicle entertainment system 11 may be positioned within a vehicle front console or dashboard 13. The head unit 10 may comprise an upper mounting plate 7, a plurality of mounting bosses 8, and a plurality of attachment tabs 9 for mounting the head unit 10 within the dashboard 13 as is well known in the art. In another embodiment, the head unit 10 may be positioned within a center console 15 positioned between a front driver side seat 16 and a front passenger side seat 17. The head unit 10 may be positioned anywhere within the interior space 12 chosen with sound judgment by a person of ordinary skill. The head unit 10 may provide a unified hardware interface for the various components of the vehicle entertainment system 11. The head unit 10 may allow an operator to control one or more among various entertainment media such as an AM/FM radio, a satellite radio, a compact disc (CD) player, a digital video disc (DVD) player, and a GPS navigation system.

Figure 3:
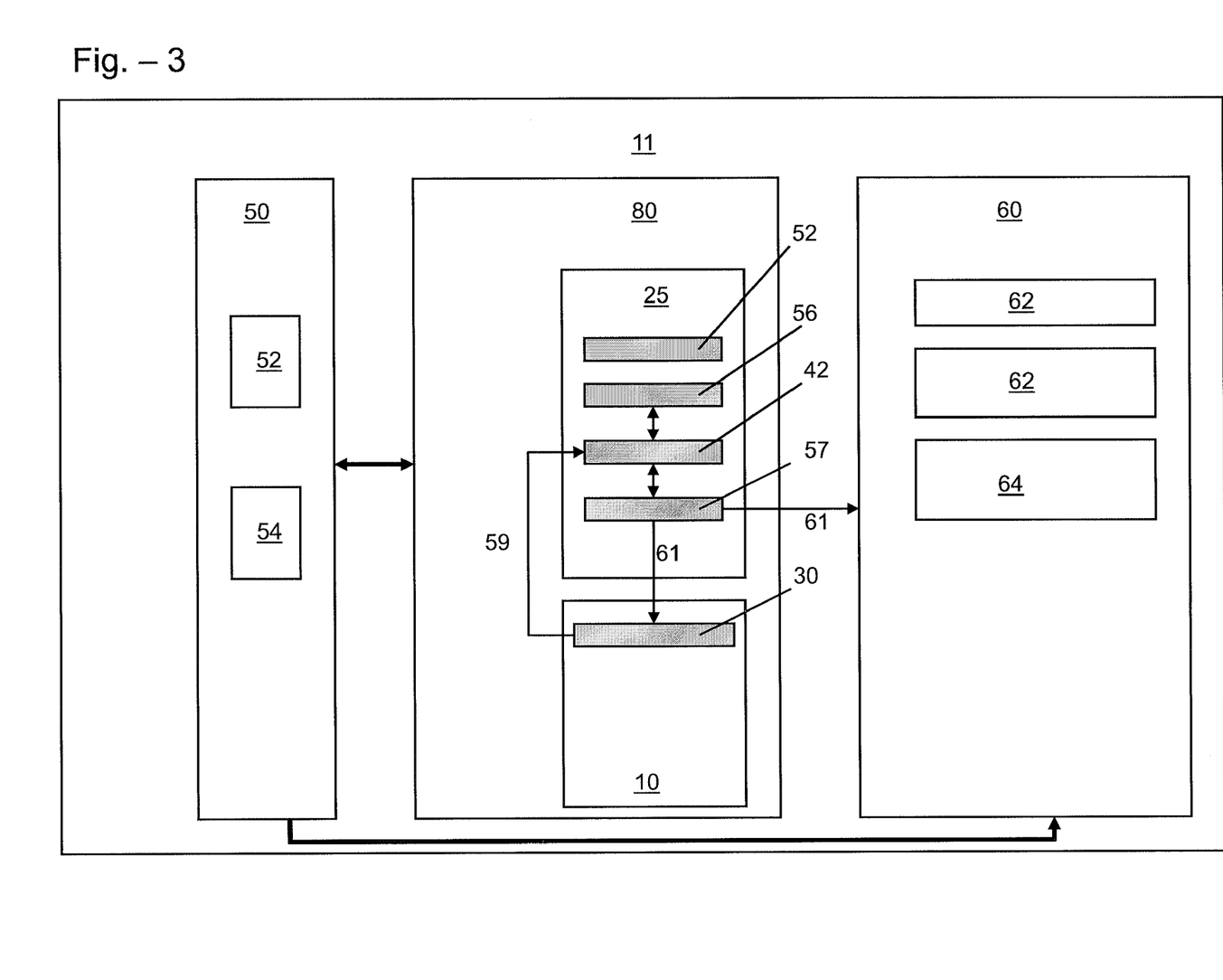
FIG. 3 shows a schematic view of a vehicle entertainment system according to one embodiment of the invention.

With reference now to FIGS. 1 and 3, the vehicle entertainment system 11 may comprise a device component portion 50, an output component portion 60, and a control portion 80. In one embodiment, the device component portion 50 may comprise a radio tuner assembly 52 and a compact disc assembly 54. The device component portion 50 may comprise any number of and any type of entertainment, navigational, or operational systems chosen with sound judgment by a person of ordinary skill. The device component portion 50 may be operatively coupled to the control portion 80 as is well known in the art. The output component portion 60 may be operatively coupled to the device component portion 50 and may comprise at least a first speaker device 62. In one embodiment, the device component portion 50 may transmit audio signals through the speaker device 62 across an audio wire (not shown) such that the audio signals may be heard by the vehicle occupants. In other embodiments, the output component portion 60 may comprise a plurality of speaker devices 62 positioned throughout the interior portion 12 of the vehicle 1. The output component portion 60 may also comprise a display screen device 64 for displaying images received from a digit video disc (DVD) player (not shown) of the device component portion 50 to the vehicle occupants.

With continued reference to FIGS. 1 and 3, the control portion 80 may comprise the head unit 10 and an electronic control unit 25. The electronic control unit 25 may comprise a printed circuit board 79. Additionally, the electronic control unit 25 may comprise a central processing unit (CPU) 42, a non-volatile memory 52, a signal input portion 56, and a signal output portion 57, coupled to the electronic control unit 25. The CPU 42 may control the operation of the device components comprising the device component portion 50, and may include a microprocessor, a microcontroller, an application specific integrated circuit or other like electronic device chosen with sound engineering judgment. The non-volatile memory 52 may comprise read only memory (ROM) or electrically erasable programmable read only memory (EEPROM) and may provide stored instructions and other data utilized by the CPU 42. The CPU 42 may be coupled to the input signal portion 56 and the output signal portion 57. The signal input portion 56 may receive a face plate input signal 59 from the front face plate assembly 30 as well as the individual devices comprising the device component portion 50 which are then transmitted to the CPU 42. The CPU 42 may then cause the output signal portion 57 to transmit an output signal 61 to the output component portion 60 or the front face plate assembly 30 based on the input signal 59. Persons of ordinary skill in the art will recognize that the electronic control unit 25 may, in one embodiment, be realized by controlling a computer with software. The type and/or the configuration of the hardware and software comprising the electronic control unit 25 may take any form chosen with sound judgment by a person of ordinary skill in the art and is not meant to serve as a limiting feature to the invention. Therefore, virtual circuit blocks are used to describe systems that may be used to implement the individual functions of the invention.

Figure 4:
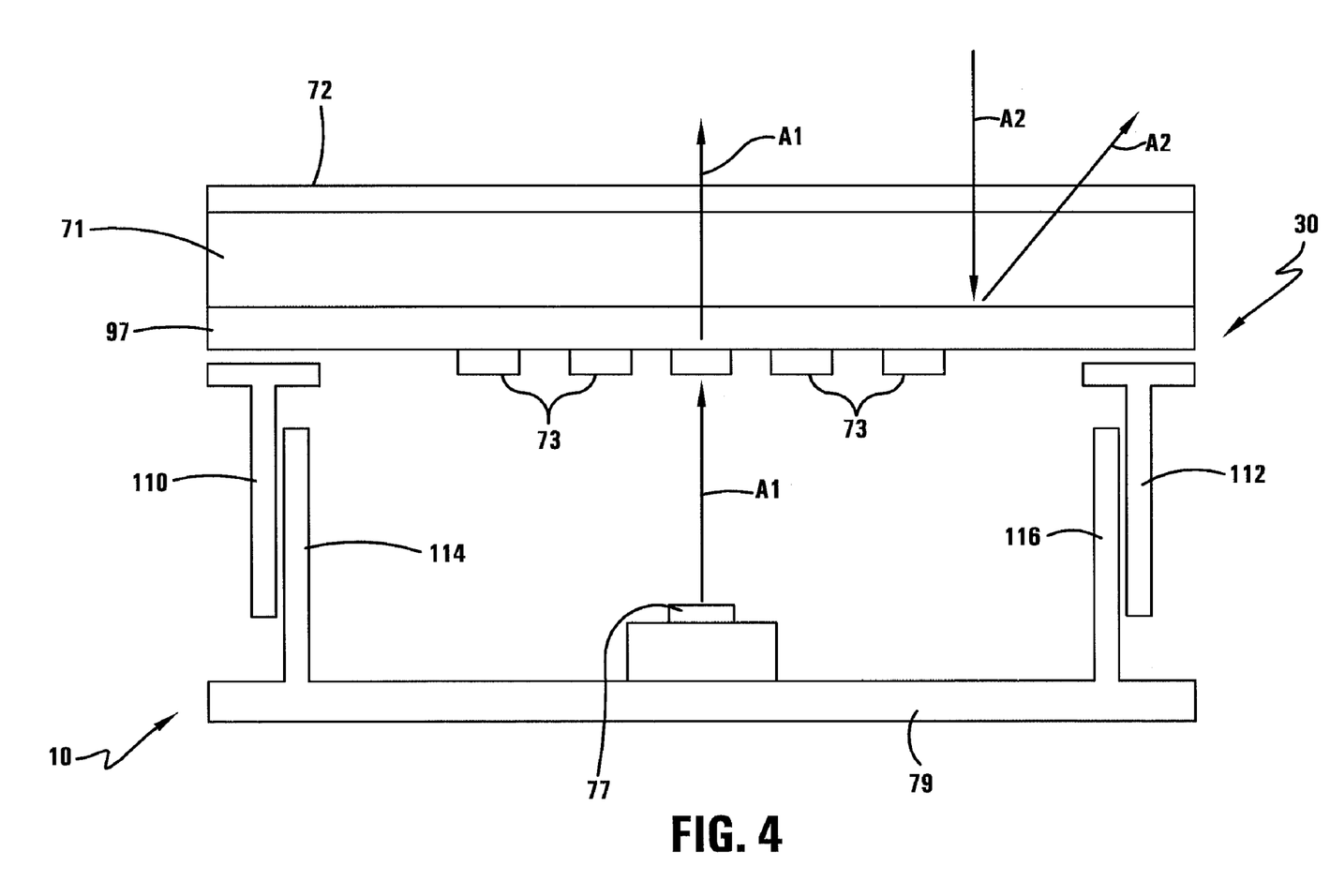
FIG. 4 shows a schematic view of a head unit according to one embodiment of the invention.
Figure 5:
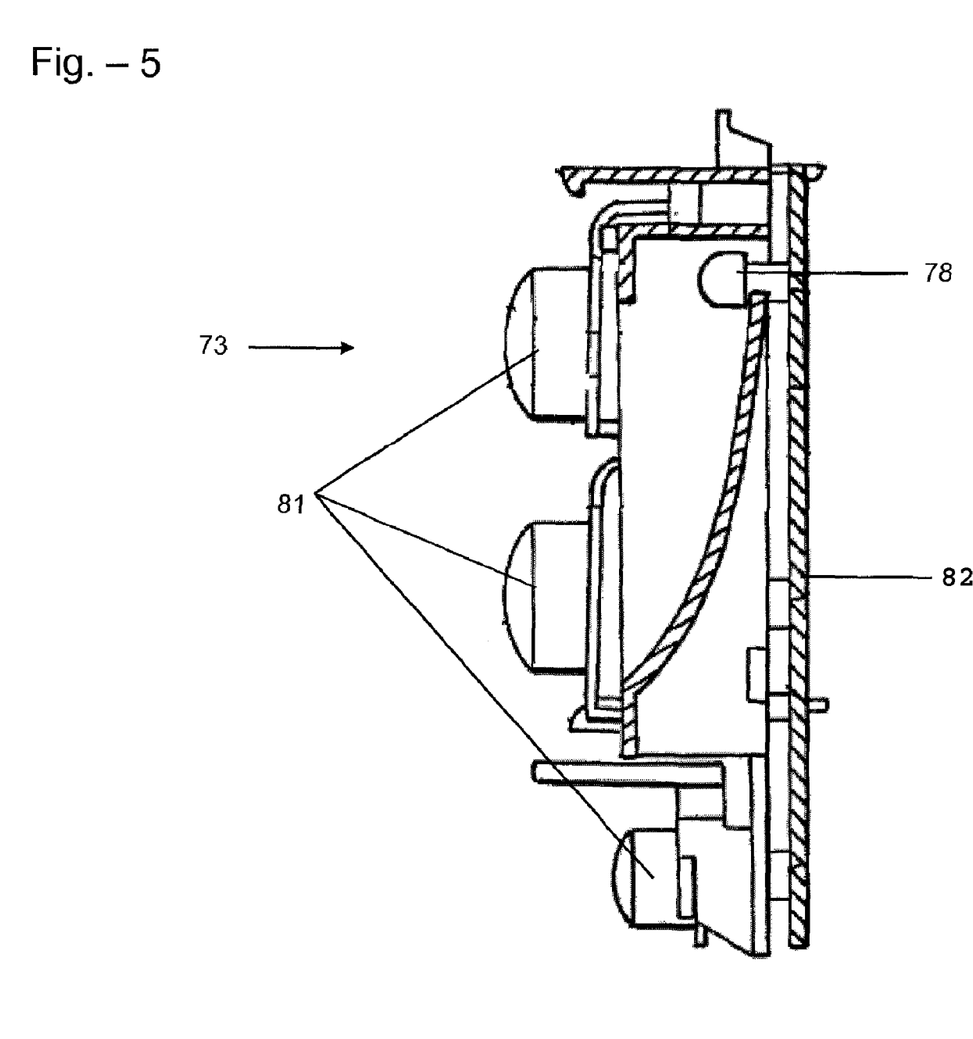
FIG. 5 shows a perspective cross-sectional view of a button carrier portion according to one embodiment of the invention.
Figure 6:
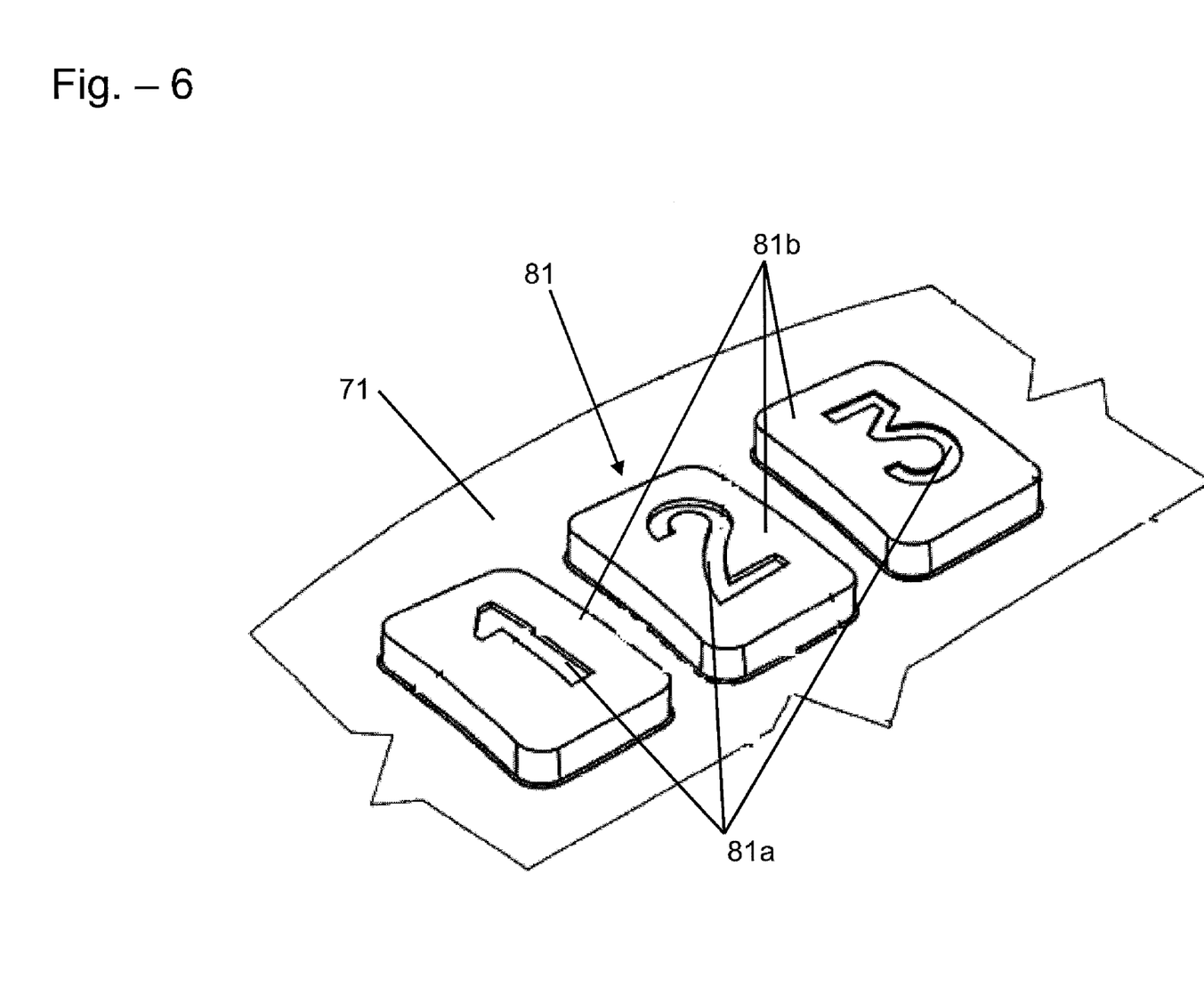
FIG. 6 shows a partial perspective view of a front face plate assembly according to one embodiment of the invention.

With reference now to FIGS. 4-6, the front face plate assembly 30 may comprise a front panel or bezel 71, a button carrier portion 73, and a light source 77. The button carrier portion 73 may comprise a molded piece formed of a uniform translucent resin or plastics material such as a white translucent polycarbonate. The button carrier portion 73 may be attached to the bezel 71. In one embodiment, the button carrier portion 73 may be attached to the inner surface of the bezel 71 with a conventional fastener such as self-tapping screws or an adhesive. The button carrier portion 73 may be attached to the bezel 71 utilizing any method chosen with sound judgment by a person of ordinary skill. The button carrier portion 73 may comprise a plurality of manually actuated buttons 81, a second printed circuit board 82, and a button light source 78. The button carrier portion 73 and the button light source 78 may be coupled to the second printed circuit board 82. The button light source 78 may emit a light at least partially for illuminating the button carrier portion 73. The plurality of manually actuated buttons 81 may be at least partially covered in an opaque coating 81b such that each of the plurality of manually actuated buttons 81 may display information related to the function of the button (as shown in FIG. 5) when illuminated from behind, through the uncoated portions 81a by the button light source 78. In another embodiment, the front face plate assembly 30 may comprise a plurality of button carrier portions 73. Additionally, the front plate assembly 30 may comprise a display carrier portion (not shown) for providing a front face plate display (not shown), such as a liquid crystal display (LCD), that provides the operator with information relating to the manipulation of one of the plurality of manually actuated buttons 81.

Figure 7:
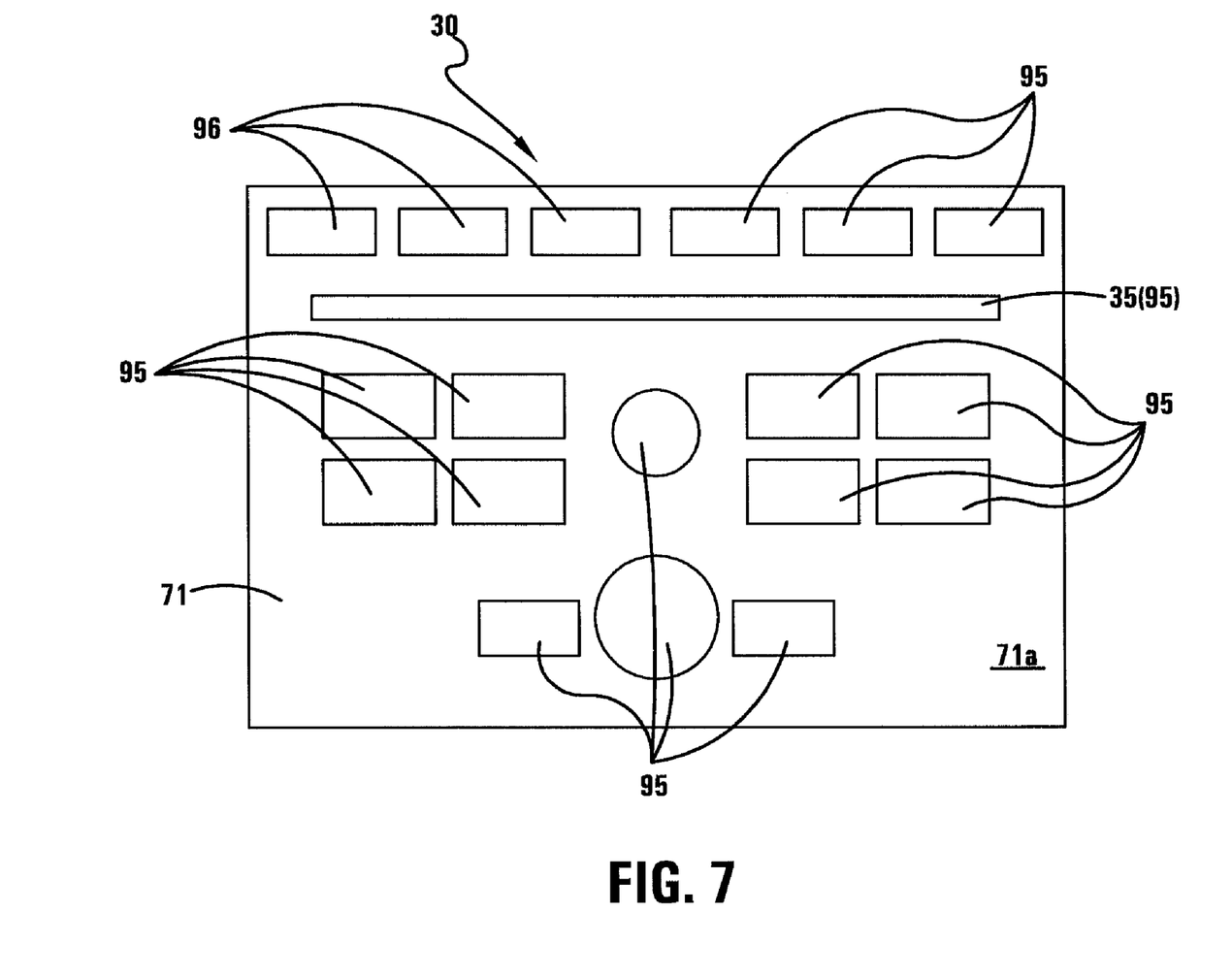
FIG. 7 shows a schematic view of a front face plate assembly according to one embodiment of the invention.

With reference now to FIGS. 4 and 7, in one embodiment, the bezel 71 may comprise an injection molded polycarbonate (PC) or polymethylmethacrylate (PMMA) plate having a bezel protective layer 72, a decorative film 97, and a plurality of bezel apertures 95. The bezel 71 may comprise a color to easily transmit light, such as an opalescent color. In one embodiment, the bezel protective layer 72 may be located on the outer surface 71a of the bezel 71. The bezel protective layer 72 may comprise an abrasion and ultraviolet (UV) resistant hardcoat layer formed from a polysiloxane resin composition that reduces glare resulting from external ambient light and protects against the scratching or marring of the front face plate assembly 30. In another embodiment, the bezel protective layer 72 may comprise a polyurethane composition. The bezel protective layer 72 may be formed of any composition chosen with sound judgment by a person of ordinary skill. Alternatively, the bezel 71 may not comprise the bezel protective layer 72.

With reference now to FIGS. 3-5, and 7, the plurality of bezel apertures 95 may extend through the bezel 71 and may receive the plurality of manually actuated buttons 81 such that each of the plurality of manually actuated buttons 81 projects through a single aperture of the plurality of bezel apertures 95. The manipulation of one of the plurality of manually actuated buttons 81 may establish a conductive pathway and at least partially cause the face plate input signal 59 to be transmitted across the conductive pathway to be received by the input signal portion 56 of the electrical control unit 25. Additionally, in one embodiment, the plurality of manually actuated buttons 81 may comprise a first insertion slot 35. The insertion slot 35 may allow a vehicle occupant to insert an audio/visual medium such as a cassette tape, a compact disc (CD), or a digital video disc (DVD) through the front face plate assembly 30 and into the corresponding device of the device component portion 50. In one embodiment, the front face plate assembly 30 may comprise a plurality of insertion slots 35. In another embodiment, the front face plate assembly 30 may comprise one insertion slot 35 for each device of the device component portion 50.

Figure 8:
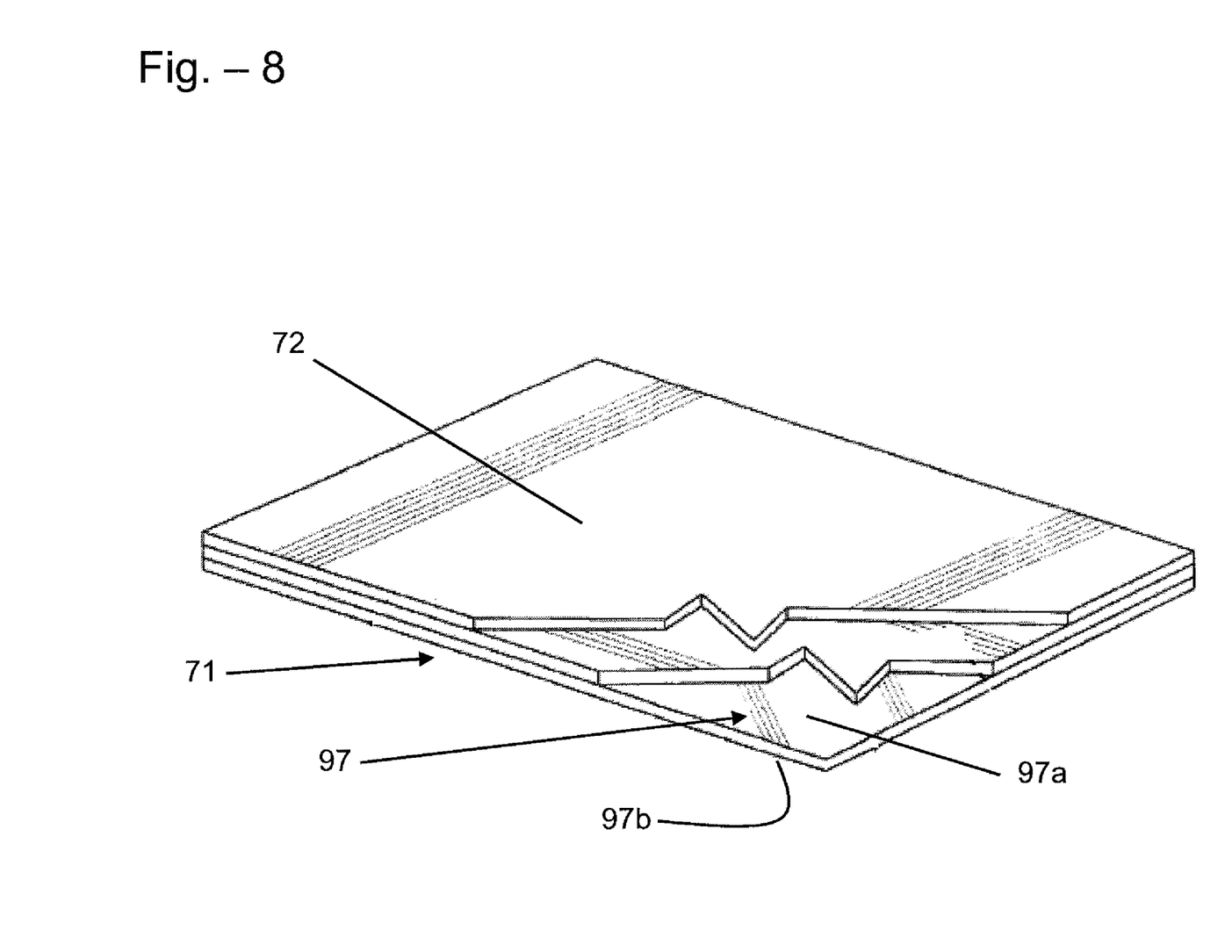
FIG. 8 shows a partial cut-away view of a bezel according to one embodiment of the invention.
Figure 9:
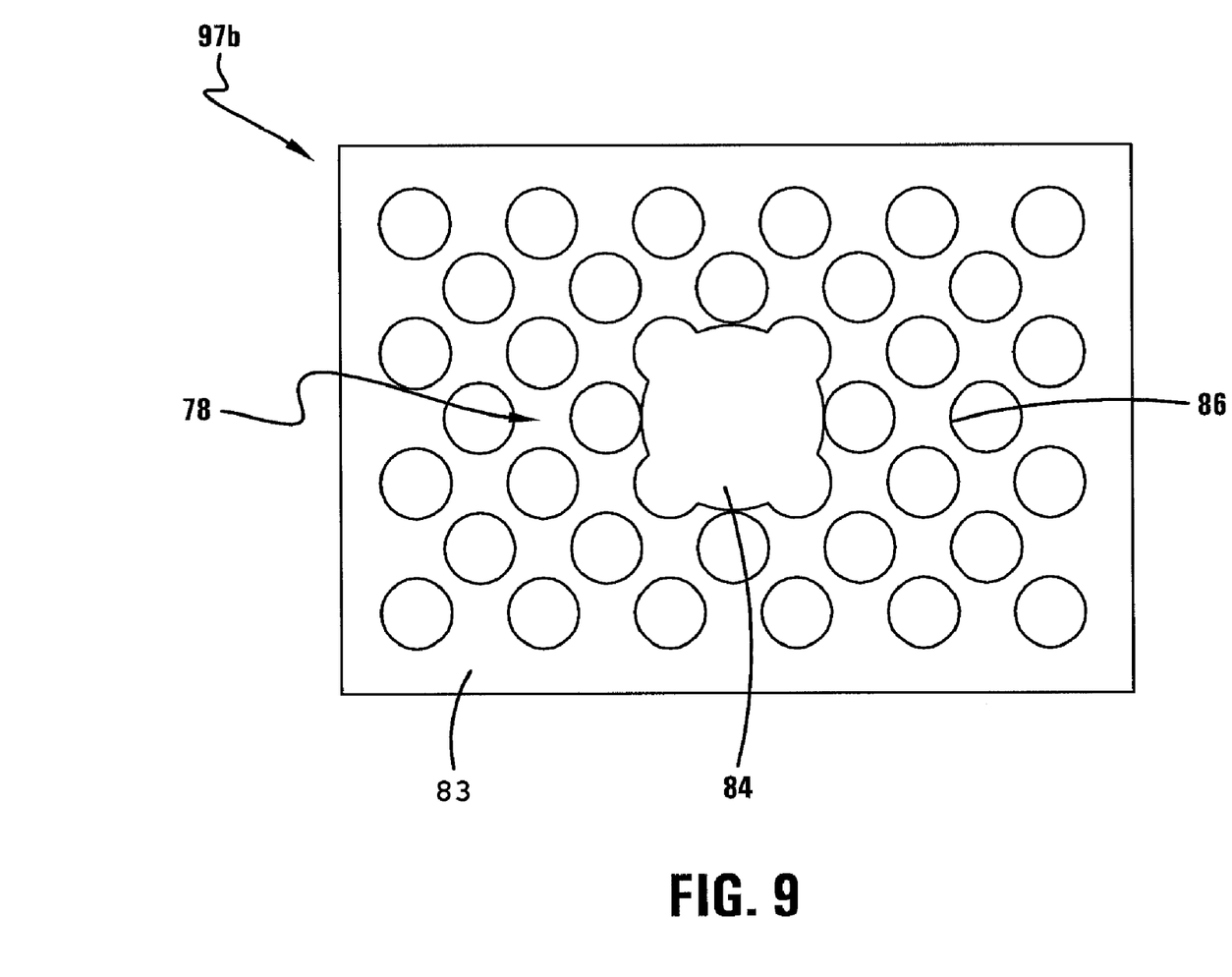
FIG. 9 shows a perspective view of the diffusing side of a decorative film according to one embodiment of the invention.

With reference now to FIGS. 4, 8-9, the decorative film 97 may be an integrated layer of the bezel 71. In one embodiment, the decorative film 97 may be integrated onto the bezel 71 during an injection molding process. The decorative film 97 may a transparent resin composition and may comprise a reflecting side 97a and a diffusing side 97b. The reflecting side 97a may comprise a half-mirrored surface that allows emitted light to pass out of the front face plate assembly 30 (shown by arrow A1) while preventing light from passing into the front face plate assembly 30 (shown by arrow A2). In one embodiment, the mirrored surface 98 may comprise a uniform metallized or metallic coating, such as a Mylar film, that is selectively etched away. In another embodiment, the mirrored surface 98 may be printed or silk-screened onto the reflecting side 97a. The diffusing side 97b may comprise a diffusion pattern 78. In one embodiment, the diffusion pattern 78 may comprise a non-uniform diffusion pattern that is concentrated to diffuse the greatest amount of emitted light in areas adjacent to the light source 77. The diffusion pattern 78 may become dispersed across the diffusing side 97b as a function of distance from the light source 77. The diffusion pattern 78 may comprise a heavy print area 84 and a lighter print area 86. The difference between the refractive index of the heavier print area 84 and the transparent resin 83 may be greater than the difference between the refractive index of the lighter print area 86 and the transparent resin 83. The heavier print area 84 may comprise a substantially circular shape and may be positioned substantially directly in front of the light source 77 thereby providing the greatest amount of diffusion in the area receiving the greatest amount of light from the light source 77. The light source 77 may be coupled to the printed circuit board 79 and may be positioned directly opposite of the heavier print area 84 of the diffusion pattern 78. Light emitted from the light source 77 may be obstructed and diffused by the diffusion pattern 78 such that the intensity of the light that penetrates through the decorative film 97 is regulated and emitted uniformly across the bezel 71. The diffusion pattern 78 may be printed or otherwise applied to the diffusing side 97b. In one embodiment, the diffusion pattern 78 may be silk-screened onto the diffusing side 97b of the decorative film 97. The diffusion pattern 78 may be attached or applied to the diffusing side 97b of the decorative film 97 utilizing any method chosen with sound judgment by a person of ordinary skill.

With reference now to FIG. 4, the bezel 71 may comprise a first interface piece 110 and a second interface piece 112 that may comprise an acrylonitrile butadiene styrene (ABS) substrate and may extend from the inner surface of the bezel 71. The first and second interface pieces 110, 112 may at least partially allow the bezel 71 to be coupled to the printed circuit board 79. Additionally, a first light blocking appendage 114 and a second light blocking appendage 116 may span between the inner surface of the bezel 71 and the printed circuit board 79. The first and second light blocking appendages 114, 116 may comprise an ABS composition suitable for substantially completely preventing the passage of light and may substantially completely prevent light emitted from the light source 77 from passing through portions of the head unit 10 other than the front face plate assembly 30 as described above.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A bezel comprising:
   a plurality of bezel apertures extending through the bezel; and,
   an integrated decorative film comprising:
      a first side having a half-mirrored surface that allows emitted light to pass through the bezel in a single direction only; and,
      a second side having a non-uniform diffusion pattern that is dispersed across the second side as a function of distance from a light source positioned to irradiate light on the second side that allows a light irradiated onto the second side to pass through the decorative film and be regulated and emitted uniformly across the bezel;
   wherein a portion of the light irradiated from the light source enters the integrated decorative film through the second side and exits the integrated decorative film through the first side.

2. The bezel of claim 1, wherein:
   the integrated decorative film comprises a transparent resin; and,
   the non-uniform diffusion pattern comprises a relatively heavier print area and a relatively lighter print area, wherein the difference between the refractive index of the relatively heavier print area and the transparent resin is greater than the different between the refractive index between the relatively lighter print area and the transparent resin.

3. The bezel of claim 1, wherein the integrated decorative film is integrated with the bezel.

4. A head unit comprising:
   an electronic control portion comprising:
      a printed circuit board; and,
      a light source coupled to the printed circuit board; and,
   a front face panel assembly comprising:
      a button carrier portion comprising a plurality of manually actuated buttons operatively coupled to the printed circuit board; and,
      a bezel coupled to the printed circuit board, wherein the bezel comprises:
         a plurality of bezel apertures extending through the bezel, wherein the plurality of manually actuated buttons extend through the plurality of bezel apertures; and,
         an integrated decorative film comprising:
            a first side having a half-mirrored surface that allows light emitted from the light source to pass through the bezel while substantially completely preventing light from passing in the opposite direction; and,
            a second side having a non-uniform diffusion pattern that is dispersed across the second side as a function of distance from the light source;
         wherein a portion of the light emitted from the light source enters the integrated decorative film through the second side and exits the integrated decorative film through the first side.

5. The head unit of claim 4, wherein:
   the integrated decorative film comprises a transparent resin; and,
   the non-uniform diffusion pattern comprises a relatively heavier print area and a relatively lighter print area wherein the difference between the refractive index of the relatively heavier print area and the transparent resin is greater than the different between the refractive index between the relatively lighter print area and the transparent resin.

6. The head unit of claim 4, wherein the integrated decorative film is integrated with the bezel.

7. A vehicle entertainment system comprising:
   a device component;
   an output component; and,
   a control portion comprising an electronic control unit and a head unit, wherein the head unit comprises:
      an electronic control portion operatively coupled to the device component and the output component comprising: a printed circuit board; a light source coupled to the printed circuit board; and, a front face panel assembly comprising:
         a button carrier portion comprising a plurality of manually actuated buttons operatively coupled to the printed circuit board; and,
         a bezel coupled to the printed circuit board, wherein the bezel comprises:
            a plurality of bezel apertures extending through the bezel, wherein the plurality of manually actuated buttons extend through the plurality of bezel apertures;
            an integrated decorative film comprising:
               a first side having a half-mirrored surface that allows light emitted from the light source to pass through the bezel while substantially completely preventing light from passing in the opposite direction;
               a second side having a non-uniform diffusion pattern that is dispersed across the second side as a function of distance from the light source;
            wherein a portion of the light emitted from the light source enters the integrated decorative film through the second side and exits the integrated decorative film through the first side.

8. The vehicle entertainment system of claim 7, wherein:
   the integrated decorative film comprises a transparent resin; and,
   the non-uniform diffusion pattern comprises a relatively heavier print area and a relatively lighter print area wherein the difference between the refractive index of the relatively heavier print area and the transparent resin is greater than the different between the refractive index between the relatively lighter print area and the transparent resin.

9. The vehicle entertainment system of claim 7, wherein the integrated decorative film is integrated with the bezel.

10. The bezel of claim 1, wherein the light source is positioned a set distance from the second side and the light source is positioned to provide the greatest amount of light substantially in the center of the second side of the integrated decorative film.

11. The head unit of claim 4, wherein the light source is positioned a set distance from the second side and the light source is positioned to provide the greatest amount of light substantially in the center of the second side of the integrated decorative film.

12. The vehicle entertainment system of claim 7, wherein the light source is positioned a set distance from the second side and the light source is positioned to provide the greatest amount of light substantially in the center of the second side of the integrated decorative film.

13. The bezel of claim 2, wherein the relatively heavier print area is substantially located in the center of the second side and the relatively lighter print area at least partially surrounds the relatively heavier print area.

14. The head unit of claim 5, wherein the relatively heavier print area is substantially located in the center of the second side and the relatively lighter print area at least partially surrounds the relatively heavier print area.

15. The vehicle entertainment system of claim 8, wherein the relatively heavier print area is substantially located in the center of the second side and the relatively lighter print area at least partially surrounds the relatively heavier print area.

16. The bezel of claim 2, wherein the relatively heavier print area is substantially located in the center of the second side and the relatively lighter print area comprises a plurality of separate relatively lighter print areas spaced apart and positioned around the relatively heavier print area.

17. The head unit of claim 5, wherein the relatively heavier print area is substantially located in the center of the second side and the relatively lighter print area comprises a plurality of separate relatively lighter print areas spaced apart and positioned around the relatively heavier print area.

18. The vehicle entertainment system of claim 8, wherein the relatively heavier print area is substantially located in the center of the second side and the relatively lighter print area comprises a plurality of separate relatively lighter print areas spaced apart and positioned around the relatively heavier print area.

* * * * *